United States Patent
Cook et al.

(10) Patent No.: US 10,594,753 B2
(45) Date of Patent: Mar. 17, 2020

(54) SYSTEM AND METHOD FOR IDENTIFYING EXTERNAL CONNECTIONS IN A STREAMING APPLICATION

(71) Applicant: International Business Machines Corporation, Armonk, NY (US)

(72) Inventors: Alexander Cook, Chaska, MN (US); Peter A. Nicholls, Janetville (CA); Jason A. Nikolai, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 15/860,876

(22) Filed: Jan. 3, 2018

(65) Prior Publication Data
US 2019/0207990 A1 Jul. 4, 2019

(51) Int. Cl.
*G06F 15/16* (2006.01)
*H04L 29/06* (2006.01)
*H04L 12/26* (2006.01)

(52) U.S. Cl.
CPC ........ *H04L 65/4069* (2013.01); *H04L 43/026* (2013.01); *H04L 65/1069* (2013.01)

(58) Field of Classification Search
CPC ....... H04L 43/00; H04L 43/026; H04L 43/04; H04L 43/045; H04L 65/1069; H04L 65/4069
See application file for complete search history.

(56) References Cited

U.S. PATENT DOCUMENTS

| | | | |
|---|---|---|---|
| 9,063,788 B2 | 6/2015 | Gedik et al. | |
| 9,152,689 B2 | 10/2015 | Branson et al. | |
| 9,183,107 B2* | 11/2015 | Branson | G06F 11/3048 |
| 9,195,559 B2* | 11/2015 | Branson | G06F 11/3048 |
| 9,396,157 B2 | 7/2016 | Cradick et al. | |
| 9,514,159 B2 | 12/2016 | Barsness et al. | |
| 2007/0094491 A1* | 4/2007 | Teo | H04L 63/1408 713/153 |
| 2015/0039389 A1* | 2/2015 | Besehanic | G06Q 30/0201 705/7.29 |
| 2016/0094427 A1 | 3/2016 | Talat et al. | |
| 2016/0344605 A1* | 11/2016 | Branson | G06F 11/3636 |
| 2018/0181870 A1* | 6/2018 | Osborne | G06N 5/025 |
| 2018/0183843 A1* | 6/2018 | Osborne | H04L 65/4069 |
| 2019/0222597 A1* | 7/2019 | Crabtree | H04L 43/045 |
| 2019/0319850 A1* | 10/2019 | Fawcett | H04L 43/0876 |

* cited by examiner

*Primary Examiner* — Jonathan A Bui
(74) *Attorney, Agent, or Firm* — Robert C. Bunker

(57) ABSTRACT

A method, computer program product, and computing device for monitoring network activity associated with streaming a data load through a stream application including a plurality of stream operators deployed on a plurality of computing devices. One or more stream operators with one or more external connections may be identified from the plurality of stream operators. The identified one or more stream operators may be deployed based upon, at least in part, the one or more external connections.

20 Claims, 7 Drawing Sheets

SYSTEM AND METHOD FOR IDENTIFYING EXTERNAL CONNECTIONS IN A STREAMING APPLICATION

BACKGROUND

In distributed stream processing, many stream operators associated with streaming applications may make external connections (e.g., TCP, HTTP, etc.) to databases, messaging servers, etc. These external connections may bring data into a streaming application. These stream operators may have operator code (e.g., custom stream operators that may be written from scratch in Java or C++ which may configure one or more external connections) that may not be directly controlled by a stream computing management application. As such, there may not be visibility into the connections being made by a stream operator. For example, a source operator may appear healthy from a stream computing management application perspective, but may not be receiving any data or messages. This may be because the stream operator hasn't successfully set up the external connection or may be because there are no data and/or messages to be consumed. Unless a developer creates and manages a custom metric for each custom source operator, there may be no way to tell without digging into trace logs. From a more malicious perspective, vulnerabilities or problems may arise if a stream operator that shouldn't be making external connections, suddenly starts doing so.

BRIEF SUMMARY OF DISCLOSURE

In one example implementation, a computer-implemented method is executed on a computing device and may include but is not limited to monitoring network activity associated with streaming a data load through a stream application including a plurality of stream operators deployed on a plurality of computing devices. One or more stream operators with one or more external connections may be identified from the plurality of stream operators. The identified one or more stream operators may be deployed based upon, at least in part, the one or more external connections.

One or more of the following example features may be included. Monitoring the network activity associated with streaming the data load may include profiling at least one stream operator of the plurality of stream operators with expected connection information during development of the stream application and associating the expected connection information with the at least one stream operator. Identifying the one or more stream operators may include identifying one or more internal connections between the plurality of stream operators from the monitored network activity associated with streaming the data load and filtering the one or more stream operators with external connections from the plurality of stream operators based upon, at least in part, identifying the one or more internal connections between the plurality of stream operators. Deploying the identified one or more stream operators with the one or more external connections may include deploying at least one of the identified one or more stream operators on one or more computing devices designated for external connections. Deploying the identified one or more stream operators with the one or more external connections may include fusing at least one of the identified one or more stream operators to one or more other stream operators of the plurality of stream operators. Deploying the identified one or more stream operators with the one or more external connections may include wrapping at least one of the identified one or more stream operators with additional exception handling. Deploying the identified one or more stream operators with the one or more external connections may include deploying at least one of the identified one or more stream operators in a consistent region. External connection information associated with the one or more external connections from the plurality of stream operators may be displayed in a user interface. Deploying the identified one or more stream operators may include deploying the identified one or more stream operators via the user interface.

In another example implementation, a computer program product resides on a non-transitory computer readable medium that has a plurality of instructions stored on it. When executed across one or more processors, the plurality of instructions cause at least a portion of the one or more processors to perform operations that may include but are not limited to monitoring network activity associated with streaming a data load through a stream application including a plurality of stream operators deployed on a plurality of computing devices. One or more stream operators with one or more external connections may be identified from the plurality of stream operators. The identified one or more stream operators may be deployed based upon, at least in part, the one or more external connections.

One or more of the following example features may be included. Monitoring the network activity associated with streaming the data load may include profiling at least one stream operator of the plurality of stream operators with expected connection information during development of the stream application and associating the expected connection information with the at least one stream operator. Identifying the one or more stream operators may include identifying one or more internal connections between the plurality of stream operators from the monitored network activity associated with streaming the data load and filtering the one or more stream operators with external connections from the plurality of stream operators based upon, at least in part, identifying the one or more internal connections between the plurality of stream operators. Deploying the identified one or more stream operators with the one or more external connections may include deploying at least one of the identified one or more stream operators on one or more computing devices designated for external connections. Deploying the identified one or more stream operators with the one or more external connections may include fusing at least one of the identified one or more stream operators to one or more other stream operators of the plurality of stream operators. Deploying the identified one or more stream operators with the one or more external connections may include wrapping at least one of the identified one or more stream operators with additional exception handling. Deploying the identified one or more stream operators with the one or more external connections may include deploying at least one of the identified one or more stream operators in a consistent region. External connection information associated with the one or more external connections from the plurality of stream operators may be displayed in a user interface. Deploying the identified one or more stream operators may include deploying the identified one or more stream operators via the user interface.

In another example implementation, a computing system may include one or more processors and one or more memories, wherein the computing system is configured to perform operations that may include but are not limited to monitoring network activity associated with streaming a data load through a stream application including a plurality of stream operators deployed on a plurality of computing devices. One or more stream operators with one or more external connections may be identified from the plurality of stream operators. The identified one or more stream operators may be deployed based upon, at least in part, the one or more external connections.

One or more of the following example features may be included. Monitoring the network activity associated with streaming the data load may include profiling at least one stream operator of the plurality of stream operators with expected connection information during development of the stream application and associating the expected connection information with the at least one stream operator. Identifying the one or more stream operators may include identifying one or more internal connections between the plurality of stream operators from the monitored network activity associated with streaming the data load and filtering the one or more stream operators with external connections from the plurality of stream operators based upon, at least in part, identifying the one or more internal connections between the plurality of stream operators. Deploying the identified one or more stream operators with the one or more external connections may include deploying at least one of the identified one or more stream operators on one or more computing devices designated for external connections. Deploying the identified one or more stream operators with the one or more external connections may include fusing at least one of the identified one or more stream operators to one or more other stream operators of the plurality of stream operators. Deploying the identified one or more stream operators with the one or more external connections may include wrapping at least one of the identified one or more stream operators with additional exception handling. Deploying the identified one or more stream operators with the one or more external connections may include deploying at least one of the identified one or more stream operators in a consistent region. External connection information associated with the one or more external connections from the plurality of stream operators may be displayed in a user interface. Deploying the identified one or more stream operators may include deploying the identified one or more stream operators via the user interface.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE SEVERAL VIEWS OF THE DRAWINGS

Like reference symbols in the various drawings indicate like elements.

DETAILED DESCRIPTION

Figure 1:
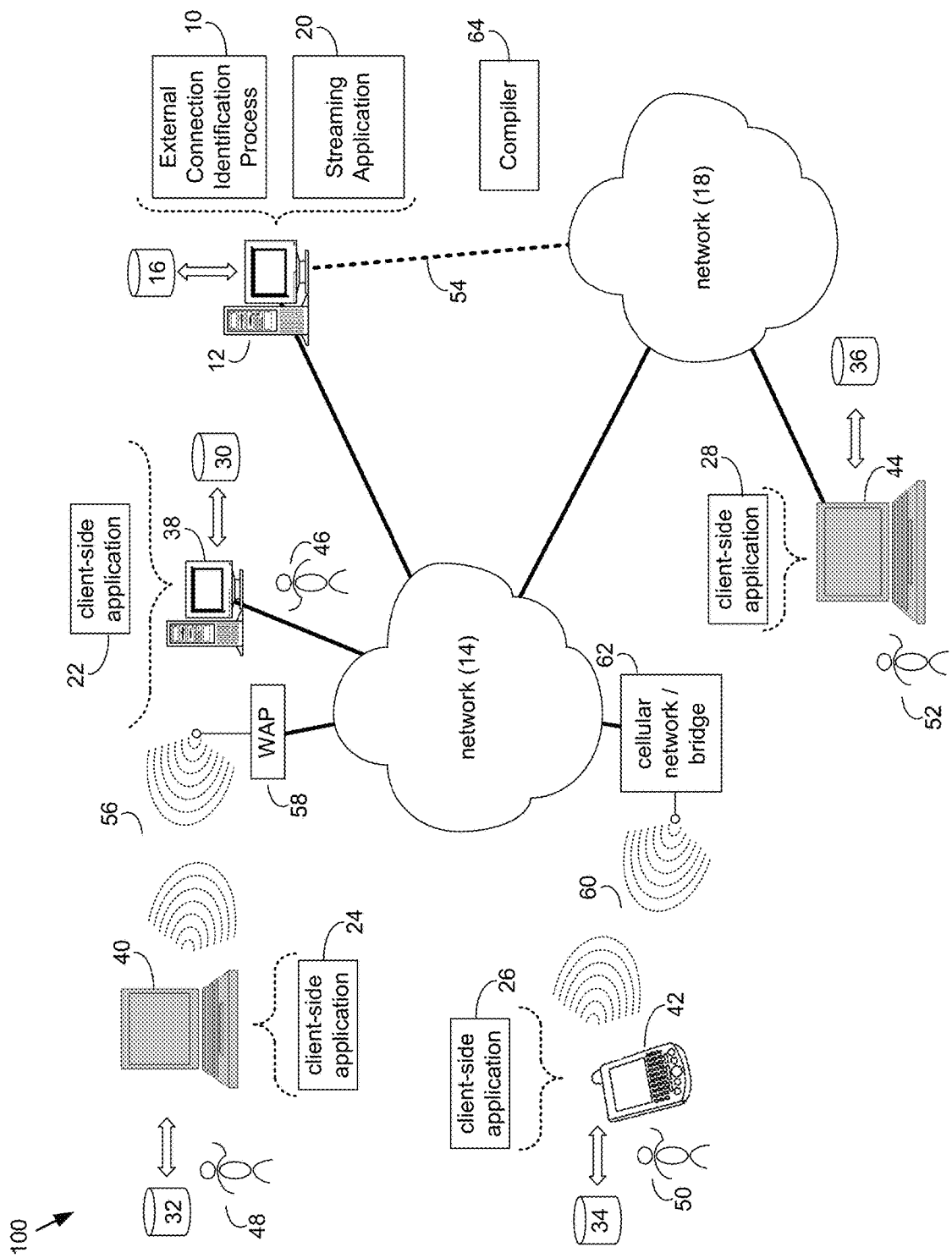
FIG. 1 is an example diagrammatic view of external connection identification process coupled to a distributed computing network according to one or more example implementations of the disclosure.
Figure 2:
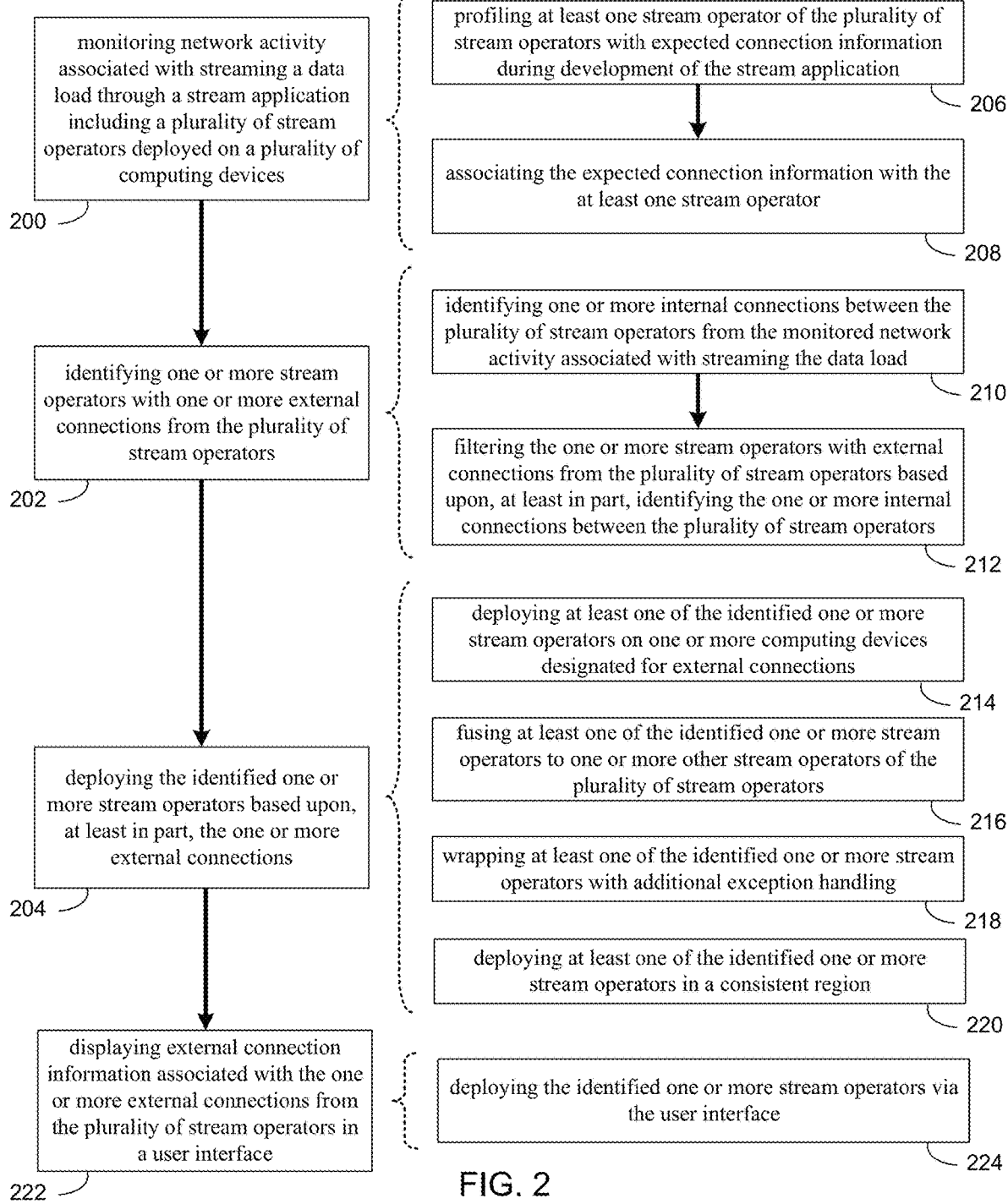
FIG. 2 is an example flowchart of the external connection identification process of FIG. 1 according to one or more example implementations of the disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown external connection identification external connection identification process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, an external connection identification process, such as external connection identification process 10 of FIG. 1, may monitor network activity associated with streaming a data load through a stream application including a plurality of stream operators deployed on a plurality of computing devices. One or more stream operators with one or more external connections may be identified from the plurality of stream operators. The identified one or more stream operators may be deployed based upon, at least in part, the one or more external connections.

The instruction sets and subroutines of external connection identification external connection identification process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

External connection identification process 10 may be a stand-alone application that interfaces with an applet/application that is accessed via client applications 22, 24, 26, 28, 66. In some embodiments, external connection identification process 10 may be, in whole or in part, distributed in a cloud computing topology. In this way, computing device 12 and storage device 16 may refer to multiple devices, which may also be distributed throughout network 14 and/or network 18.

Computing device 12 may execute a streaming application (e.g., streaming application 20), examples of which may include, but are not limited to, e.g., IBM® Streams®, Apache® Storm™ Software, TIBCO Streambase®, or other application that allows for the analysis and correlation of information from data stream sources. (IBM and Streams are registered trademarks of International Business Machines Corporation in the United States, other countries or both; Apache is a registered trademark of Apache Software Foundation (ASF) in the United States, other countries or both; Storm is an unregistered trademark of Apache Software Foundation in the United States, other countries, or both;

TIBCO and Streambase are registered trademarks of TIBCO Software Inc. in the United States, other countries or both). Streaming application 20 may also be referred to as a stream computing application and/or a stream processing application. Overflow activation external connection identification process 10 and/or streaming application 20 may be accessed via client applications 22, 24, 26, 28. For example, client electronic devices 38, 40, 42, 44 may create, implement, upload, and/or modify a streaming application on server 12 via client applications 22, 24, 26, 28. Overflow activation external connection identification process 10 may be a stand-alone application, or may be an applet/application/script/extension that may interact with and/or be executed within streaming application 20, a component of streaming application 20, and/or one or more of client applications 22, 24, 26, 28. Streaming application 20 may be a stand-alone application, or may be an applet/application/script/extension that may interact with and/or be executed within overflow activation external connection identification process 10, a component of overflow activation external connection identification process 10, and/or one or more of client applications 22, 24, 26, 28. One or more of client applications 22, 24, 26, 28 may be a stand-alone application, or may be an applet/application/script/extension that may interact with and/or be executed within and/or be a component of overflow activation external connection identification process 10 and/or streaming application 20. Examples of client applications 22, 24, 26, 28 may include, but are not limited to, e.g., IBM Streams, or other application that allows for the analysis and correlation of information from data stream sources, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28, 66 may be configured to effectuate some or all of the functionality of external connection identification process 10 (and vice versa). Accordingly, external connection identification process 10 may be a purely server-side application, a purely client-side application, or a hybrid server-side/client-side application that is cooperatively executed by one or more of client applications 22, 24, 26, 28, 66 and/or external connection identification process 10.

One or more of client applications 22, 24, 26, 28, may be configured to effectuate some or all of the functionality of streaming application 20 (and vice versa). Accordingly, streaming application 20 may be a purely server-side application, a purely client-side application, or a hybrid server-side/client-side application that is cooperatively executed by one or more of client applications 22, 24, 26, 28 and/or streaming application 20. As one or more of client applications 22, 24, 26, 28, external connection identification process 10, and streaming application 20, taken singly or in any combination, may effectuate some or all of the same functionality, any description of effectuating such functionality via one or more of client applications 22, 24, 26, 28, external connection identification process 10, streaming application 20, or combination thereof, and any described interaction(s) between one or more of client applications 22, 24, 26, 28, external connection identification process 10, streaming application 20, or combination thereof to effectuate such functionality, should be taken as an example only and not to limit the scope of the disclosure.

Users 46, 48, 50, 52 may access computing device 12 and external connection identification process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. External connection identification process 10 may include one or more user interfaces, such as browsers and textual or graphical user interfaces, through which users 46, 48, 50, 52 may access external connection identification process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some embodiments, computing device 12 may include a compiler 64 for compiling streaming application 20 and/or deploying a plurality of stream operators on a plurality of computing devices.

As discussed above and referring also at least to FIGS. 2-7, external connection identification process 10 may monitor 200 network activity associated with streaming a data load through a stream application including a plurality of stream operators deployed on a plurality of computing devices. One or more stream operators with one or more external connections may be identified 202 from the plurality of stream operators. The identified one or more stream operators may be deployed 204 based upon, at least in part, the one or more external connections.

In some implementations consistent with the present disclosure, systems and methods may be provided for automatically monitoring external connections of stream operators and deploying stream operators based upon, at least in part, the presence of external connections. In distributed stream processing and as will be discussed in greater detail below, many stream operators may make external connections (e.g., TCP, HTTP, etc.) to databases, messaging servers, etc. In some implementations, these external connections may bring data into a streaming application (e.g., streaming application 20). In some implementations, these stream operators may have operator code (e.g., custom stream operators that may be written from scratch in Java or C++ which may configure one or more external connections) that may not be directly controlled by a stream computing management application (e.g., IBM Streams). As such, there may not be visibility into the connections being made by a stream operator. For example, a source operator (e.g., an Apache Kafka® source stream operator) may appear healthy from a stream computing management application perspective, but may not be receiving any data or messages. This may be because the stream operator hasn't successfully set up the external connection or it may be because there are no data and/or messages to be consumed. Unless a developer creates and manages a custom metric for each custom source operator, there may be no way to tell without digging into trace logs. From a more malicious perspective, vulnerabilities or problems may arise if a stream operator that shouldn't be making external connections, suddenly starts doing so. As will be discussed in greater detail below, external connection identification process 10 may automatically identify and monitor external connections and may make operator deployment decisions based on the presence of external connections.

As generally discussed above with reference to FIGS. 2 and 3, external connection identification process 10 may monitor 200 network activity associated with streaming a data load through a stream application including a plurality of stream operators deployed on a plurality of computing devices. In a stream application or a stream computing application (e.g., streaming application 300), a plurality of logical operations or stream operators (e.g., stream operators Operator A 302, Operator B 304, Operator C 306, Operator D 308) may be connected to one another such that a data load flows from one stream operator to the next (e.g., over a TCP/IP socket). When a stream operator (e.g., Operator B 304) receives data, it may perform logical operations which may change the data load by adding attributes, subtracting attributes, and/or updating the values of existing attributes within the data load. When the logical operation of the stream operator is complete, the data load may be output and sent to the next stream operator. In some implementations, a source stream operator may generally include a stream operator that may input a data load into a streaming application and a sink stream operator may generally include a stream operator that may output the data load from the streaming application. As will be discussed in greater detail below, the source stream operators and/or sink stream operators may include one or more external connections outside of the streaming application.

In some embodiments, stream operators in a streaming application may be placed in a processing element (e.g., Processing Element A 310) that may be executable by a computing device. In this way, a processing element may be an execution container for stream operators. In some implementations, stream operators may be fused together within a processing element (e.g., a processing element with a plurality of fused stream operators). In some embodiments, stream operators may share a common processing space (e.g., may be deployed in the same processing element), resulting in much faster communication between stream operators than is available using inter-process communication techniques (e.g., between stream operators deployed in different processing elements). In some embodiments, one or more processing elements capable of processing a data load may be deployed or executed on one or more computing devices. For example, a computing device (e.g., System A 312) may execute one or more processing elements. Each processing element may be capable and/or configured to process a received data load based upon, at least in part, one or more stream operators placed in the processing element. In some embodiments, a computing device, such as computing device 12, may include and/or execute any number of processing elements capable of and/or configured to process the received data load.

In some embodiments, a data load, in the context of stream computing, may flow from one stream operator and/or processing element to another in the form of a tuple. In some embodiments, a tuple may be a sequence of one or more attributes associated with an entity. Attributes may be any of a variety of different types, (e.g., integer, float, Boolean, string, etc.) In some embodiments, the attributes may be ordered. In addition to attributes associated with an entity, a tuple may include metadata, (i.e., data about the tuple). A tuple may be extended by adding one or more additional attributes or metadata to it. A stream or a data stream may generally refer to a sequence of tuples. In some embodiments, a stream may be considered a pseudo-infinite sequence of tuples.

As discussed above and in some embodiments, an output tuple may be changed (e.g., relative to an input tuple) in some way by a stream operator. An attribute or metadata may be added, deleted, or modified. For example, a tuple may have one or more attributes. A stream operator may receive the tuple having multiple attributes and output a tuple corresponding with the input tuple. In one example, the stream operator may change one of the attributes so that all of the attributes of the output tuple except e.g., one are the same as the attributes of the input tuple. However, any number of changes may be made to the input tuple such that the output tuple includes the changes made to the input tuple.

In some implementations, external connection identification process 10 may receive a streaming application which may specify one or more stream operators through which a data load may be processed to obtain a desired output data load. External connection identification process 10 may compile the streaming application (e.g., via compiler 64) to deploy the one or more stream operators specified by the streaming application in one or more processing elements on one or more computing devices. In this way, external connection identification process 10 may determine whether or not to fuse various stream operators into the same processing element, which stream operators to deploy on various computing devices, how the stream operators may be deployed over time (e.g., in response to changes in demand by the streaming application), etc. In some implementations, external connection identification process 10 may control and/or configure the internal connections of the plurality of stream operators while streaming the data load (e.g., during runtime). It will also be appreciated that external connection identification process 10 may control and/or configure the internal connections of the plurality of stream operators during testing and development of streaming application.

Figure 3:
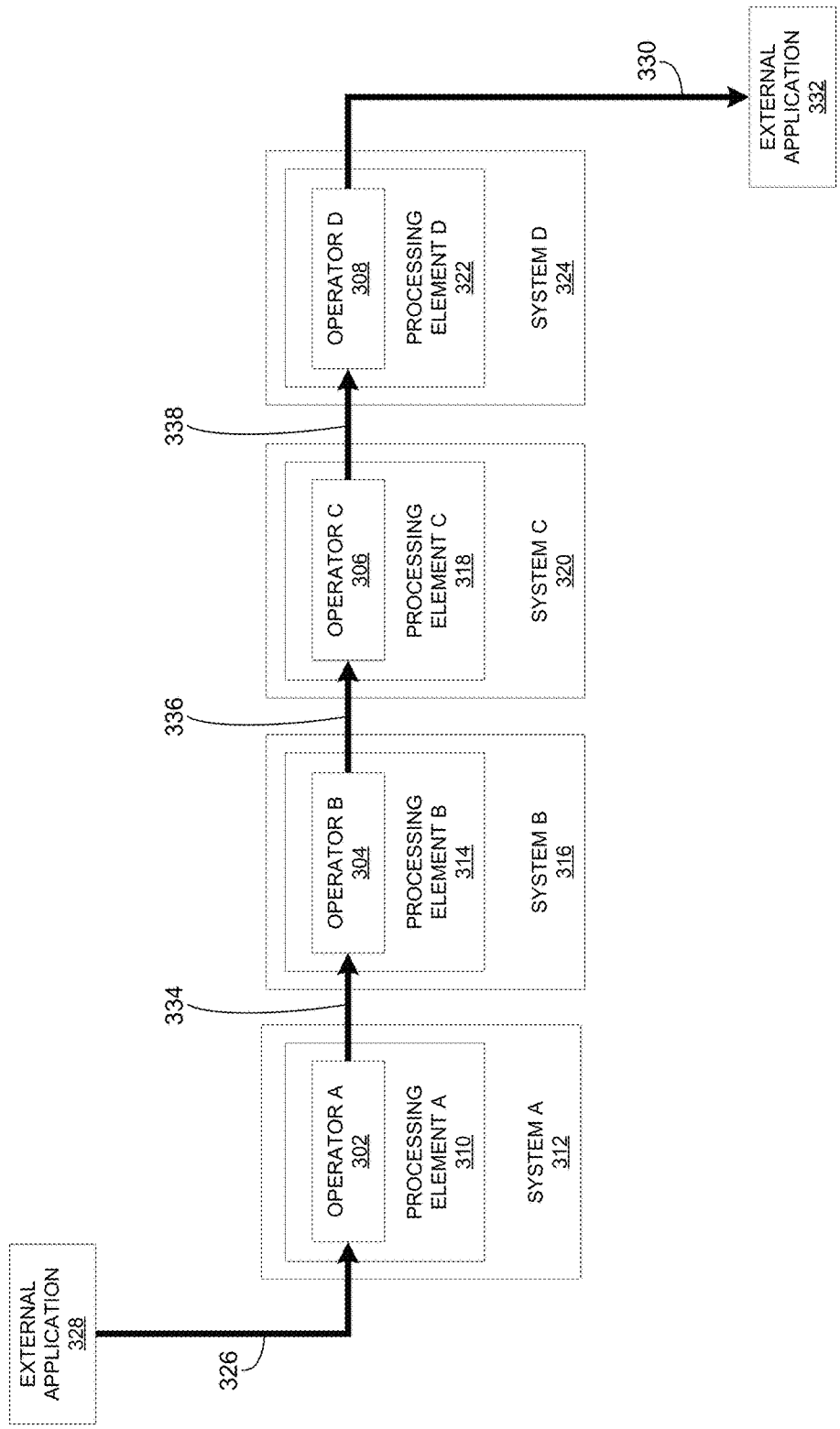
FIG. 3 is an example diagrammatic view of a streaming application according to one or more example implementations of the disclosure.

In some embodiments, a streams graph may generally describe a connected graph of stream operators through which the data load or tuple may progress through for a given streaming application. Referring also to FIG. 3, and as will be described in greater detail below, a streams graph 300 may include a plurality of stream operators, 302, 304, 306, 308. In the example of FIG. 3, the plurality of stream operators 302, 304, 306, 308 may also be referred to Operator A 302, Operator B 304, Operator C 306, and Operator D 308, respectively. In some embodiments, and as discussed above, the plurality of stream operators may be placed in a processing element and/or may be deployed on a computing device. For example, Operator A 302 may be placed in Processing Element A 310 and may be deployed on System A 312, Operator B 304 may be placed in Processing Element B 314 and may be deployed on System B 316, Operator C 306 may be placed in Processing Element C 318 and may be deployed on System C 320, and Operator D 308 may be placed in Processing Element D 322 and may be deployed on System D 324. As discussed above, the plurality of stream operators may be placed in a plurality of processing elements to execute the plurality of stream operators by the plurality of computing devices.

As will be discussed in greater detail below, one or more stream operators (e.g., Operator A 302) may be configured as a source stream operator with one or more external connections (e.g., external connection 326) to one or more non-streaming applications (e.g., external application 328) and one or more stream operators (e.g., Operator D 308) may be configured as a sink stream operator with one or more external connections (e.g., external connection 330) to one or more non-streaming applications (e.g., external application 332). In some implementations, one or more operators may include one or more internal connections (e.g., internal connections 334, 336, 338).

In some implementations, external connection identification process 10 may monitor 200 network activities back to a specific process (e.g., corresponding to a specific processing element and/or stream operator) using various methodologies. For example, external connection identification process 10 may monitor 200 the network activity associated with streaming the data load via one or more e.g., Linux® commands or other commands associated with a streaming application. In this way, external connection identification process 10 may monitor all network activity for the processes (e.g., stream operators and/or processing elements) that are part of a streaming application including one or more external connections and one or more internal connections. For example, external connection identification process 10 may monitor the movement of tuples into and out of a processing element and/or stream operator. In the example of FIG. 3, external connection identification process 10 may monitor 200 network activity of the plurality of stream operators (e.g., Operator A 302, Operator B 304, Operator C 306, and Operator D 308). In some implementations, external connection identification process 10 may monitor 200 the network activity of the plurality of stream operators (e.g., Operator A 302, Operator B 304, Operator C 306, Operator D 308) by monitoring the network activity of the plurality of processing elements (e.g., Processing Element A 310, Processing Element B 314, Processing Element C 318, Processing Element D 322) on the plurality of computing devices (e.g., System A 312, System B 316, System C 320, System D 324).

In some implementations, monitoring 200 the network activity associated with streaming the data load may include profiling 206 at least one stream operator of the plurality of stream operators with expected connection information during development of the stream application and associating 208 the expected connection information with the at least one stream operator. In some implementations, monitoring 200 the network activity associated with streaming the data load may occur during a development phase of the streaming application. For example, a developer may desire to utilize a streaming application to process a particular data load. In some implementations, external connection identification process 10 may provide an Integrated Development Environment (IDE) for developing a streaming application. For example, the IDE may allow a developer to specify a plurality of stream operators to use in a streaming application. The developer may specify how the data load is input to the streaming application and how the data load may be output from the streaming application. As such, the developer may create custom source and/or sink stream operators that determine how a data load is input to and/or output from the streaming application based on the specific requirements of the developer's data loads. For example, the source and/or sink stream operators created by the developer may include one or more external connections.

Figure 4:
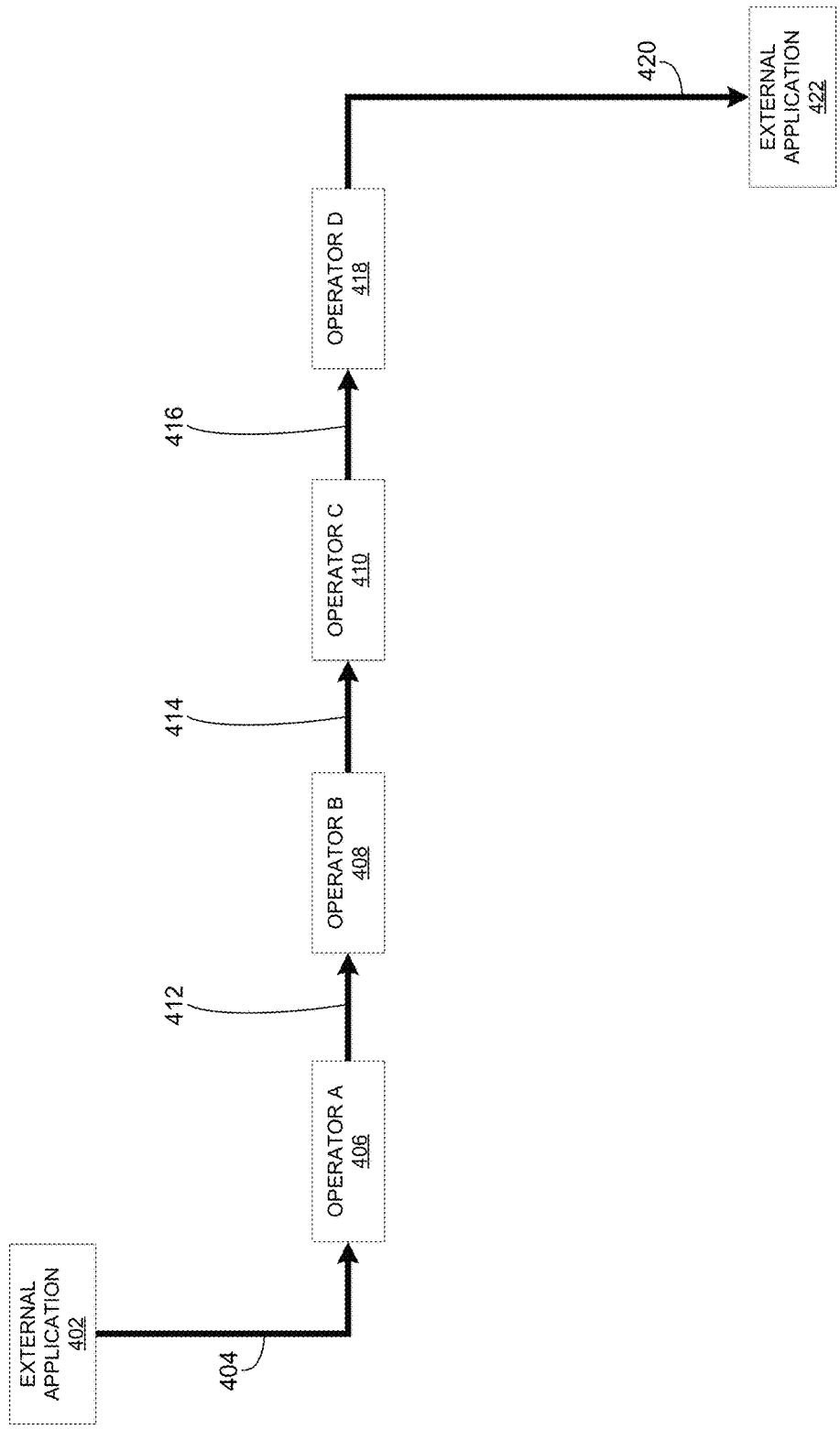
FIG. 4 is an example diagrammatic view of a streaming application according to one or more example implementations of the disclosure.

Referring also to FIG. 4 and in some implementations during development and testing of the stream application, external connection identification process 10 may automatically profile 206 the source and/or sink stream operators and may keep the expected connection information as stream operator metadata. For example, profiling 206 a stream operator may generally include determining expected connection information (e.g., the number of external connections and/or the number of internal connections) for the stream operator. For example, suppose a developer creates the streaming application of FIG. 4 where a data load is provided to a stream computing environment by an external application (e.g., external application 402) via an external connection (e.g., external connection 404) to a source operator (e.g., Operator A 406) with additional internal connections between the source operator (e.g., Operator A 406), one or more intermediary stream operators (e.g., Operator B 408, Operator C 410) via one or more internal connections (e.g., internal connections 412, 414, 416), and a sink operator (e.g., Operator D 418). In some implementations, the sink stream operator may include an external connection (e.g., external connection 420) to an external application (e.g., external application 422) which may receive the data load processed by streaming application 400.

In some implementations and while a streaming application is developed and/or tested (e.g., via the IDE of external connection identification process 10), external connection identification process 10 may profile 206 the source stream operator (e.g., Operator A 406) with one external connection (e.g., external connection 404) to an external application (e.g., external application 402) and one internal connection (e.g., internal connection 412) to a stream operator (e.g., Operator B 408). In some implementations, external connection identification process 10 may profile 206 the sink stream operator (e.g., Operator D 418) with one external connection (e.g., external connection 420) to an external application (e.g., external application 422) and one internal connection (e.g., internal connection 416) to a stream operator (e.g., Operator C 408). It will be appreciated that any number of internal and/or external connections may be profiled 206 by external connection identification process 10. In some implementations, external connection identification process 10 may profile 206 the non-source and/or non-sink stream operators (e.g., Operator B 408, Operator C 410) with one or more internal connections (e.g., internal connections 412, 414, 416). In some implementations, external connection identification process 10 store this profile as expected connection information for each stream operator.

In some implementations and in response to profiling 206 the at least one stream operator of the plurality of stream operators with expected connection information during development of the streaming application, external connection identification process 10 may associate 208 the expected connection information with the at least one stream operator. Returning to the example of FIG. 4, external connection identification process 10 may associate 208 the expected connection information with each stream operator. For example, external connection identification process 10 may associate 208 Operator A 406 with the expected connection information of one external connection and one internal connection. In some implementations, external connection identification process 10 may associate 208 at least one stream operator with the expected connection information as operator metadata. Operator metadata may generally include any data regarding or related to the stream operator. In some implementations and as will be discussed in greater detail below, external connection identification process 10 may read or process operator metadata associated with a stream operator to determine whether the stream operator includes one or more external connections.

In some implementations, external connection identification process 10 may identify 202 one or more stream operators with one or more external connections from the plurality of stream operators. As discussed above and in some implementations, conventional stream application systems or systems configured to manage stream applications may not have visibility into custom made source and/or sink stream operator code to determine the connections associated with a given stream operator. In some implementations, these source and/or sink stream operators may include one or more external connections to external applications unknown to a conventional streaming application system. As discussed above, external connections may generally include one or more connections from a stream operator to another entity, server, and/or application that is outside the streaming application (e.g., a non-streaming application). In some implementations, the external connections may provide an input data load into a streaming application for processing by the stream operators of the streaming application and/or may provide an output for data loads processed by the stream operators of the streaming application. As will be discussed in greater detail below, external connection identification process 10 may automatically identify any external connections and make operator deployment decisions based on the presence of these external connections.

In some implementations, identifying 202 the one or more stream operators may include determining whether the stream operator includes expected connection information. As discussed above and in some implementations, external connection identification process 10 may profile 206 at least one stream operator with expected connection information during development of the streaming application and may associate 208 the expected connection information with the stream operator. In some implementations, the expected connection information may be associated 208 with the stream operator as operator metadata. In some implementations, external connection identification process 10 may determine whether operator metadata is associated with the stream operator and whether the operator metadata includes expected connection information.

In some implementations where external connection identification process 10 is able to determine that the stream operator includes expected connection information, external connection identification process 10 may identify 202 one or more external connections from the expected connection information. Returning to the example of FIG. 4, suppose external connection identification process 10 associated a stream operator (e.g., Operator A 406) with expected connection information profiled 206 during development of streaming application 400. In this example, external connection identification process 10 may identify one external connection (e.g., external connection 404) associated with the stream operator (e.g., Operator A 406).

In some implementations where external connection identification process 10 is unable to determine that the stream operator includes expected connection information, external connection identification process 10 may identify 202 one or more stream operators with one or more external connections during run-time. For example and in some implementations, identifying 202 the one or more stream operators may include identifying 210 one or more internal connections between the plurality of stream operators from the monitored network activity associated with streaming the data load. As discussed above, internal connections may generally include connections between stream operators and/or processing elements in a streaming application. In some implementations, external connection identification process 10 may more readily identify 210 the internal connections between the plurality of stream operators and/or processing elements because external connection identification process 10 may configure and/or determine the internal connections between the plurality of stream operators and/or processing elements when the streaming application is compiled. As discussed above, external connection identification process 10 may trace network activities back to a specific process (corresponding to a specific processing element and/or stream operator). For example, external connection identification process 10 may keep track of and/or maintain processing element and/or stream operator internal connection health and may determine which stream operators and/or processing elements to connect to each other.

In the example of FIG. 3, external connection identification process 10 may identify 210 the internal connections (e.g., internal connections 334, 336, 338) between the plurality of stream operators (e.g., Operator A 302, Operator B 304, Operator C 306, Operator D 308) by monitoring the network activity of the plurality of processing elements (e.g., Processing Element A 310, Processing Element B 314, Processing Element C 318, Processing Element D 322) on the plurality of computing devices (e.g., System A 312, System B 316, System C 320, System D 324). In some implementations, external connection identification process 10 may maintain streaming application connection information in a database or data store, (e.g., Apache Zookeeper™) for each processing element and/or stream operator. Zookeeper is an unregistered trademark of Apache Software Foundation in the United States, other countries, or both.

In some implementations, identifying 202 the one or more stream operators may include filtering 212 the one or more stream operators with external connections from the plurality of stream operators based upon, at least in part, identifying the one or more internal connections between the plurality of stream operators. In some implementations, external connection identification process 10 may identify 202 the one or more stream operators with one or more external connections by filtering the 212 the one or more identified connections from all of the monitored connections for one or more stream operators. From the example of FIG. 3 and in some implementations, external connection identification process 10 may monitor 200 all network activity associated with a plurality of stream operators. In this way, external connection identification process 10 may identify various connections (e.g., internal connections 334, 336, 338 and external connections 326, 330) associated with the plurality of stream operations. In some implementations, external connection identification process 10 may associate these various connections with one or more stream operator without e.g., previously knowing which of the various connections are internal connections or external connections.

External connection identification process 10 may identify 210 the internal connections (e.g., internal connections 334, 336, 338) between the plurality of stream operators (e.g., Operator A 302, Operator B 304, Operator C 306, Operator D 308) by monitoring the network activity of the plurality of processing elements (e.g., Processing Element A 310, Processing Element B 314, Processing Element C 318, Processing Element D 322) on the plurality of computing devices (e.g., System A 312, System B 316, System C 320, System D 324). In some implementations, external connection identification process 10 may associate the one or more internal connections (e.g., internal connection 334, 336, 338) with the plurality of stream operators (e.g., Operator A 302, Operator B 304, Operator C 306, Operator D 308). In some implementations, external connection identification process 10 may filter the one or more internal connections (e.g., internal connections 334, 336, 338) from the monitored connections (e.g., internal connections 334, 336, 338 and external connections 326, 330) to identify 204 the one or more external connections (e.g., external connections 326, 330). In this way, external connection identification process 10 may generally identify 210 the internal connections that it has set up for a given stream operator and/or processing element and may work backwards and identify 204 the external connections being made for a given stream operator and/or processing element.

In some implementations, it may be difficult to debug operators with external connections because it may not be immediately apparent if they have failed to connect or if there is simply no data. For example, it may be especially difficult to diagnose a stream operator when a stream operator is sending data, as there may be no indication that anything is wrong until one can look at the external connections and/or external server itself. In some implementations and in response to identifying 202 the one or more stream operators with one or more external connections, external connection identification process 10 may automatically display external connection information in one or more monitoring user interfaces for streaming applications. In some implementations, by automatically displaying the external connection information in the one or more monitoring user interfaces, external connection identification process 10 may make problem identification trivial when dealing with Send/Receive operators (e.g., source/sink stream operators).

Figure 5:
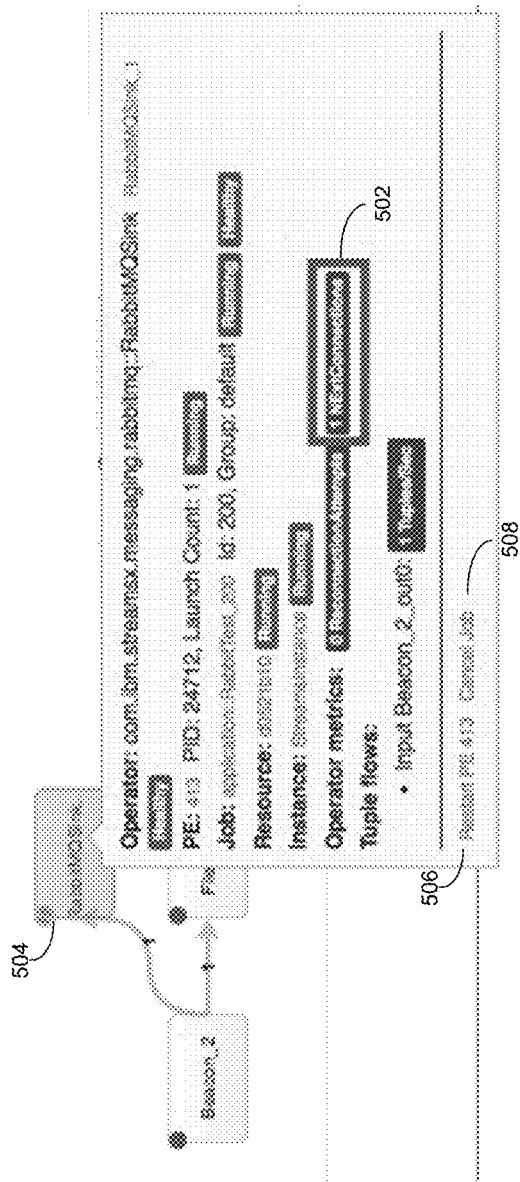
FIG. 5 is an example diagrammatic view of a streaming application monitoring user interface according to one or more example implementations of the disclosure.

Referring also to FIG. 5 and in some implementations, external connection identification process 10 may automatically display the external connection information (e.g., NExtConnections 502) for a given stream operator (e.g., stream operator 504) in a streaming application monitoring user interface (e.g., monitoring user interface 500). In some implementations, the external connection information may include a number of external connections associated with a given stream operator (e.g., stream operator 504). In some implementations, external connection identification process 10 may provide and/or display alerts if an expected number of connections are not present. For example, stream operators that stray from their expected profiling (e.g., expected connection information), may cause external connection identification process 10 to provide or display alerts (e.g., via the streaming application monitoring user interface) and/or may cause external connection identification process 10 to automatically shut down the stream operator.

In some implementations external connection identification process 10 may provide or display alerts when a given stream operator includes more than an expected number of external connections. Additionally, external connection identification process 10 may provide or display alerts when a given stream operator includes less than an expected number of external connections. In some implementations, a given stream operator including more than an expected number of external connections may be flagged as potentially malicious. For example, a stream operator that includes more than an expected number of connections may be indicative of a vulnerability or failure from external connections associated with the stream operator. Additionally, a given stream operator including less than an expected number of external connections may be flagged as potentially malicious. For example, a stream operator that includes less than an expected number of connections may be indicative of a vulnerability or failure from external connections associated with the stream operator.

In some implementations, external connection identification process 10 may deploy 204 the identified one or more stream operators based upon, at least in part, the one or more external connections. For example, using automatic profiling metadata from operator development, external connection identification process 10 may use the expected connection information for distributed deployment. As discussed above and in response to identifying one or more external connections using automatic profiling metadata during development of the streaming application, external connection identification process 10 may intelligently deploy the one or more stream operators when compiling the stream application (e.g., via compiler 64). In some implementations and in response to identifying one or more external connections at run-time, external connection identification process 10 may redeploy or configure the deployment of the one or more stream operators with one or more external connections based upon, at least in part, the one or more external connections.

In some implementations, deploying 204 the identified one or more stream operators with the one or more external connections may include deploying 214 at least one of the identified one or more stream operators on one or more computing devices designated for external connections. For example and in some implementations, only certain nodes within a stream computing environment may be designated or allowed to make external connections. External connection identification process 10 may deploy 214 the one or more stream operators profiled as making external connections on computing devices (e.g., hosts) designated for making external connections. In some implementations, stream operators that set up external connections may be moved or redeployed 214 to such computing devices (e.g., hosts). In some implementations, hosts may be configured as completely open, to allow certain kinds of external connections, and/or may only allow internal connections. External connection identification process 10 may automatically configure one or more computing devices of the plurality of computing devices for external connections and/or may allow a user (e.g., a user interface) to configure the one or more computing devices of the plurality of computing devices for external connections.

Figure 6:
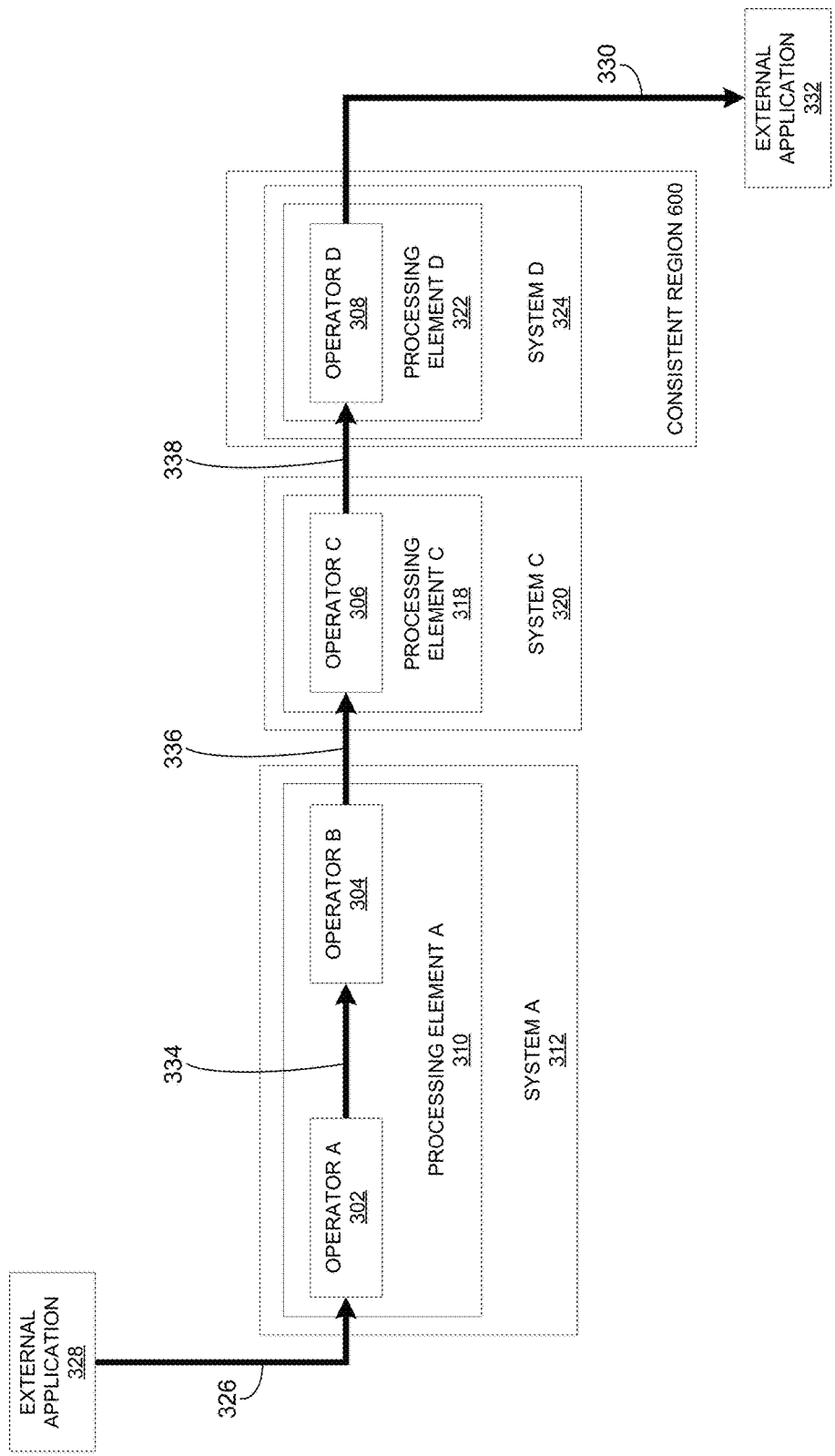
FIG. 6 is an example diagrammatic view of a streaming application according to one or more example implementations of the disclosure.

Referring also to FIG. 6 and in some implementations, deploying 204 the identified one or more stream operators with the one or more external connections may include fusing 216 at least one of the identified one or more stream operators to one or more other stream operators of the plurality of stream operators. Fusing may generally include merging two or more operators into a processing element. For example, external connection identification process 10 may determine that a streaming application may be improved by fusing two or more operators (e.g., Operator A 302 and Operator B 304) into a single processing element (e.g., Processing Element A 310). In a streaming environment, external connection identification process 10 may use this enhanced connection information as one of the determining factors on what to fuse or not fuse together when external connections are identified. For example, operators that make external connections may be more likely to fail due to network-related issues and/or bad data received from an external server. In some implementations, if the stream operator with the one or more external connections crashes (e.g., Operator A 302), the crashed stream operator may bring down other operators (e.g., Operator B 304) that may be fused with it in the same processing element (e.g., Processing Element A 310).

External connection identification process 10 may determine that a stream operator with one or more external connections may not be fused 216 to another stream operator based upon, at least in part, historical connection data. For example and as discussed above, external connection identification process 10 may not fuse a stream operator with one or more external connections to another stream operator when there is limited historical connection data. Limited historical connection data may generally indicate an insufficient amount of connection data to determine whether or not a stream operator with one or more external connections is stable enough for fusing to another stream operator. In some implementations, determining whether or not a stream operator with one or more external connections is stable enough for fusing to another stream operator may include obtaining historical connection data over a threshold period of time (e.g., a minimum historical data threshold). In some implementations, the minimum historical data threshold may be user-defined and/or may be a default minimum historical data threshold determined by external connection identification process 10.

Additionally, external connection identification process 10 may determine whether a stream operator is stable enough over the threshold period of time by determining whether the stream operator is stable for a threshold amount of time (e.g., a minimum stability threshold). In some implementations, the minimum stability threshold may be user-defined and/or may be a default minimum stability threshold determined by external connection identification process 10. For example, if Operator A 302 were "new" to the streaming application and/or if the streaming application was recently compiled, external connection identification process 10 may not have enough historical connection data to determine whether or not Operator A 302 should be fused with Operator B 304. In this example, external connection identification process 10 may not fuse 216 Operator A 302 with Operator B 304.

In some implementations, external connection identification process 10 may determine that a stream operator with one or more external connections may be fused to another stream operator based upon, at least in part, historical connection data. For example and in response to gathering sufficient historical (e.g., historical connection data over the threshold period of time), external connection identification process 10 may determine that despite being a stream operator with one or more external connections, stream operator is stable enough for fusing to another stream operator. For example, suppose external connection identification process 10 has received historical connection data associated with Operator A for over the threshold period of time. External connection identification process 10 may determine that during that time, Operator A 302 is stable enough (e.g., relative to a minimum stability threshold) to fuse with Operator B 304. External connection identification process 10 may fuse 216 Operator A 302 and Operator B 304 into Processing Element 310.

In some implementations, deploying 204 the identified one or more stream operators with the one or more external connections may include wrapping 218 at least one of the identified one or more stream operators with additional exception handling. In a streaming environment, external connection identification process 10 may utilize this enhanced connection information as one of the determining factors to automatically wrapper an operator with additional exception handling. Wrapping 218 an operator may generally include providing additional exception handling to a stream operator (e.g., via an annotation syntax). For example and with the recent introduction of automatic fusion, external connection identification process 10 may allow a stream operator with one or more external connections to be unfused from other stream operators without the risk of crashing an entire processing element in the case of an exception.

In some implementations, deploying 204 the identified one or more stream operators with the one or more external connections may include deploying 220 at least one of the identified one or more stream operators in a consistent region. A consistent region may generally include a stream computing configuration guaranteed to process each tuple of a data stream through the consistent region at least one time. For example, a consistent region may include other stream operators configured to guarantee that each tuple of the data stream is processed by a given stream operator in the consistent region at least one time. In some implementations, the other stream operators and/or the configuration of the other stream operators may provide backup or fail-safe processing of the data stream in the event that the stream operator with the one or more external connections fails. In a streaming environment, external connection identification process 10 may utilize this connection information to automatically deploy 220 a given stream operator with one or more external connections (e.g., Operator D 308) in a consistent region (e.g., Consistent Region 600). In some implementations and because stream operators making external connections may be at a higher risk of failing, external connection identification process 10 may automatically deploy 220 at least one stream operator with one or more external connections in a consistent region (when possible) to guarantee that a data load is not lost. In some implementations, determining whether or not to deploy 220 the stream operator in a consistent region may be based upon, at least in part, a user input to place the stream operator in a consistent region, the number of external connections associated with the stream operator, and/or in response to the type or importance of the data being processed by the stream operator with one or more external connections. In some implementations, external connection identification process 10 may use historical reliability of the one or more external connections to determine whether or not to deploy 220 at least one stream operator with one or more external connections in a consistent region. For example, external connection identification process 10 may deploy 220 Operator D 308 in Consistent Region 600 in response to determining that Operator D 308 has one or more unreliable sink external connections. In some implementations, external connection identification process 10 may deploy 220 Operator A 302 in a consistent region in response to determining that Operator A 302 has one or more unreliable source external connections.

In some implementations, deploying 204 the identified one or more stream operators with the one or more external connections may include tracing the identified stream operator. In some implementations, tracing a stream operator with one or more external connections may generally include logging or monitoring a processing element associated with the stream operator with one or more external connections. In some implementations, the logging or monitoring of the processing element may include recording one or more operations of the processing element during the processing of a data load. For example, external connection identification process 10 may trace when Operator D 308 receives a tuple and when Operator D 308 completes the processing of a tuple. In some implementations, external connection identification process 10 may determine whether or not to trace the stream operator with one or more external connections based upon, at least in part, the number of external connections. For example, tracing the one or more stream operators with one or more external connections (e.g., Operator D 308) may place negatively impact the computing resources and/or performance of the computing device (e.g., System D 324) hosting a processing element (e.g., Processing Element 322). In some implementations, external connection identification process 10 may trace a stream operator with a number of external connections less than or equal to a threshold number of external connections. In some implementations, external connection identification process 10 may not trace a stream operator with a number of external connections greater than a threshold number of external connections. In some implementations, the threshold number of external connections may be user-defined and/or may be a default threshold number of external connections determined by external connection identification process 10.

In some implementations and as discussed above, external connection identification process 10 may including displaying 222 external connection information associated with the one or more external connections from the plurality of stream operators in a user interface. For example, external connection identification process 10 may provide the external connection information for display via a user-interface (e.g., as shown in FIG. 5). For example, as shown in FIG. 5, external connection information regarding operator 504 may be displayed in the user interface 500.

In some implementations, the identified one or more stream operators may be deployed 224 via the user interface. For example, external connection identification process 10 may deploy the identified one or more stream operators by performing one or more corrective actions (e.g., deploying at least one of the identified one or more stream operators on one or more computing devices designated for external connections, fusing at least one of the identified one or more stream operators to one or more other stream operators of the plurality of stream operators, wrapping at least one of the identified one or more stream operators with additional exception handling, deploying at least one of the identified one or more stream operators in a consistent region, etc.) via the user interface. For example, various actions may be selected on user interface 500 for deploying the identified one or more stream operators. For example, a user may select "Restart PE 413" 506 and/or "Cancel Job" 508. It will be appreciated that other actions may be displayed on the user interface for deploying the identified one or more stream operators. For example, external connection identification process 10 may include controls, buttons, etc. for deploying at least one of the identified one or more stream operators on one or more computing devices designated for external connections, fusing at least one of the identified one or more stream operators to one or more other stream operators of the plurality of stream operators, wrapping at least one of the identified one or more stream operators with additional exception handling, deploying at least one of the identified one or more stream operators in a consistent region, etc.

Figure 7:
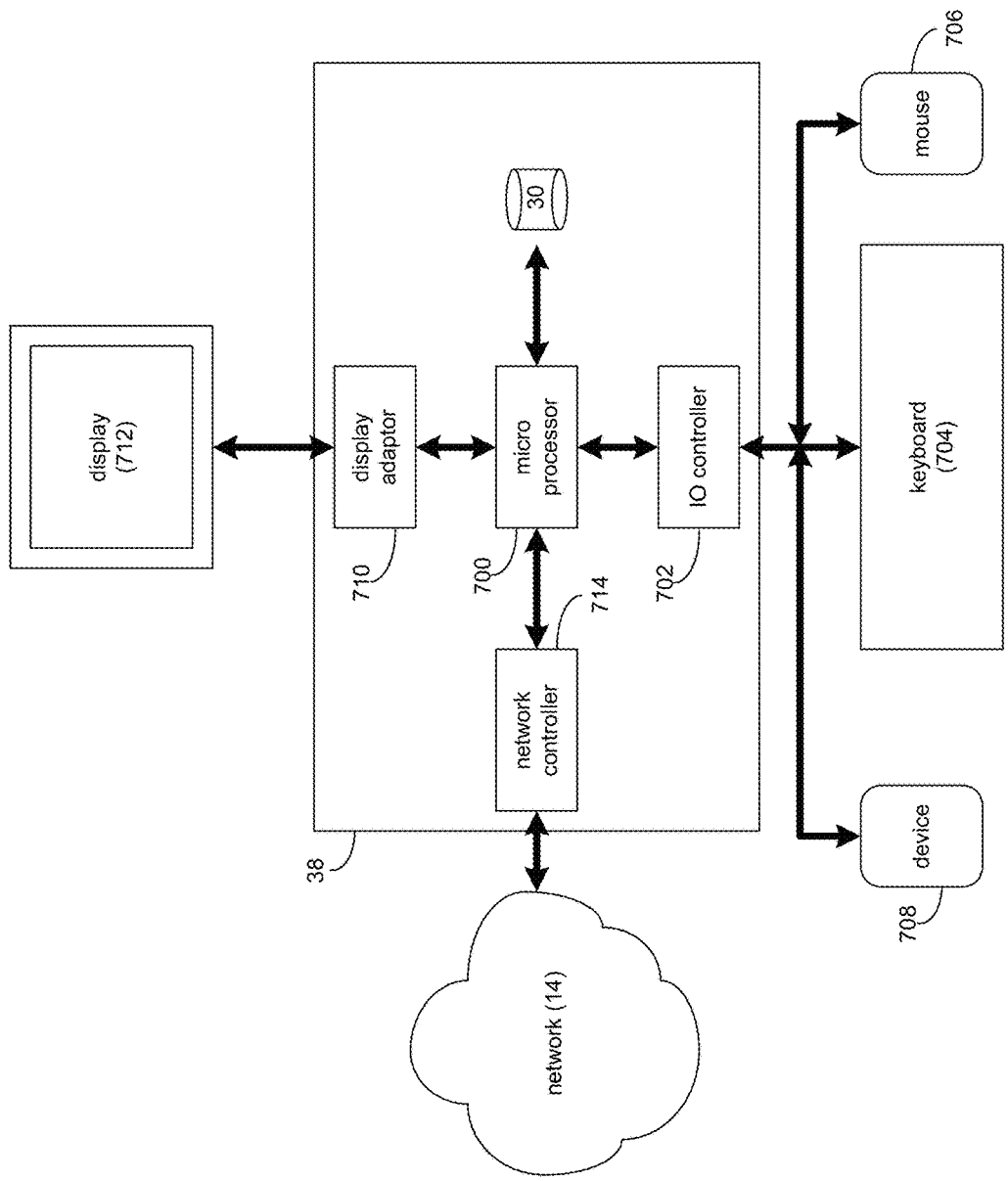
FIG. 7 is an example diagrammatic view of a client electronic device of FIG. 1 according to one or more example implementations of the disclosure.

Referring also to FIG. 7, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, external connection identification process 10 may be substituted for client electronic device 38 within FIG. 7, examples of which may include but are not limited to computing device 12 and/or client electronic devices 40, 42, 44.

Client electronic device 38 may include a processor and/or microprocessor (e.g., microprocessor 700) configured to, e.g., process data and execute the above-noted code/instruction sets and subroutines. Microprocessor 700 may be coupled via a storage adaptor (not shown) to the above-noted storage device(s) (e.g., storage device 30). An I/O controller (e.g., I/O controller 702) may be configured to couple microprocessor 700 with various devices, such as keyboard 704, pointing/selecting device (e.g., mouse 706), custom device, such a microphone (e.g., device 708), USB ports (not shown), and printer ports (not shown). A display adaptor (e.g., display adaptor 710) may be configured to couple display 712 (e.g., CRT or LCD monitor(s)) with microprocessor 700, while network controller/adaptor 714 (e.g., an Ethernet adaptor) may be configured to couple microprocessor 700 to the above-noted network 14 (e.g., the Internet or a local area network).

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
    monitoring, at a computing device, network activity associated with streaming a data load through a stream application including a plurality of stream operators deployed on a plurality of computing devices;
    identifying one or more stream operators with one or more external connections from the plurality of stream operators; and
    deploying the identified one or more stream operators based upon, at least in part, the one or more external connections.

2. The computer-implemented method of claim 1, wherein monitoring the network activity associated with streaming the data load includes:
    profiling at least one stream operator of the plurality of stream operators with expected connection information during development of the stream application; and
    associating the expected connection information with the at least one stream operator.

3. The computer-implemented method of claim 1, wherein identifying the one or more stream operators includes:
    identifying one or more internal connections between the plurality of stream operators from the monitored network activity associated with streaming the data load; and
    filtering the one or more stream operators with external connections from the plurality of stream operators based upon, at least in part, identifying the one or more internal connections between the plurality of stream operators.

4. The computer-implemented method of claim 1, wherein deploying the identified one or more stream operators with the one or more external connections includes:
    deploying at least one of the identified one or more stream operators on one or more computing devices designated for external connections.

5. The computer-implemented method of claim 1, wherein deploying the identified one or more stream operators with the one or more external connections includes:
    fusing at least one of the identified one or more stream operators to one or more other stream operators of the plurality of stream operators.

6. The computer-implemented method of claim 1, wherein deploying the identified one or more stream operators with the one or more external connections includes:
    wrapping at least one of the identified one or more stream operators with additional exception handling.

7. The computer-implemented method of claim 1, wherein deploying the identified one or more stream operators with the one or more external connections includes:
    deploying at least one of the identified one or more stream operators in a consistent region.

8. The computer-implemented method of claim 1, further comprising:
    displaying external connection information associated with the one or more external connections from the plurality of stream operators in a user interface.

9. The computer-implemented method of claim 8, wherein deploying the identified one or more stream operators includes deploying the identified one or more stream operators via the user interface.

10. A computer program product comprising a non-transitory computer readable storage medium having a plurality of instructions stored thereon, which, when executed by a processor, cause the processor to perform operations comprising:
    monitoring, at a computing device, network activity associated with streaming a data load through a stream application including a plurality of stream operators deployed on a plurality of computing devices;
    identifying one or more stream operators with one or more external connections from the plurality of stream operators; and
    deploying the identified one or more stream operators based upon, at least in part, the one or more external connections.

11. The computer program product of claim 10, wherein monitoring the network activity associated with streaming the data load includes:
    profiling at least one stream operator of the plurality of stream operators with expected connection information during development of the stream application; and
    associating the expected connection information with the at least one stream operator.

12. The computer program product of claim 10, wherein identifying the one or more stream operators includes:
    identifying one or more internal connections between the plurality of stream operators from the monitored network activity associated with streaming the data load; and
    filtering the one or more stream operators with external connections from the plurality of stream operators based upon, at least in part, identifying the one or more internal connections between the plurality of stream operators.

13. The computer program product of claim 10, wherein deploying the identified one or more stream operators with the one or more external connections includes:
    deploying at least one of the identified one or more stream operators on one or more computing devices designated for external connections.

14. The computer program product of claim 10, wherein deploying the identified one or more stream operators with the one or more external connections includes:
    fusing at least one of the identified one or more stream operators to one or more other stream operators of the plurality of stream operators.

15. The computer program product of claim 10, wherein deploying the identified one or more stream operators with the one or more external connections includes:
    wrapping at least one of the identified one or more stream operators with additional exception handling.

16. The computer program product of claim 10, wherein deploying the identified one or more stream operators with the one or more external connections includes:
    deploying at least one of the identified one or more stream operators in a consistent region.

17. The computer program product of claim 10, further comprising:
    displaying external connection information associated with the one or more external connections from the plurality of stream operators in a user interface.

18. The computer program product of claim 17, wherein deploying the identified one or more stream operators includes deploying the identified one or more stream operators via the user interface.

19. A computing system including one or more processors and one or more memories configured to perform operations comprising:
    monitoring, at a computing device, network activity associated with streaming a data load through a stream application including a plurality of stream operators deployed on a plurality of computing devices;
    identifying one or more stream operators with one or more external connections from the plurality of stream operators; and
    deploying the identified one or more stream operators based upon, at least in part, the one or more external connections.

20. The computing system of claim 19, wherein monitoring the network activity associated with streaming the data load includes:
    profiling at least one stream operator of the plurality of stream operators with expected connection information during development of the stream application; and
    associating the expected connection information with the at least one stream operator.

* * * * *